United States Patent
Lin et al.

(10) Patent No.: US 11,409,684 B2
(45) Date of Patent: Aug. 9, 2022

(54) PROCESSING ACCELERATOR ARCHITECTURES

(71) Applicant: Alibaba Group Holding Limited, Grand Cayman (KY)

(72) Inventors: Jilan Lin, Goleta, CA (US); Dimin Niu, Sunnyvale, CA (US); Shuangchen Li, Sunnyvale, CA (US); Hongzhong Zheng, Los Gatos, CA (US); Yuan Xie, Sunnyvale, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/945,619

(22) Filed: Jul. 31, 2020

(65) Prior Publication Data

US 2022/0035760 A1 Feb. 3, 2022

(51) Int. Cl.
| | |
|---|---|
| *G06F 13/36* | (2006.01) |
| *G06F 13/40* | (2006.01) |
| *G06F 13/42* | (2006.01) |
| *G06F 13/16* | (2006.01) |

(52) U.S. Cl.
CPC ...... *G06F 13/4027* (2013.01); *G06F 13/1684* (2013.01); *G06F 13/4282* (2013.01); *G06F 2213/0026* (2013.01)

(58) Field of Classification Search
None
See application file for complete search history.

(56) References Cited

U.S. PATENT DOCUMENTS

| | | | |
|---|---|---|---|
| 4,079,354 A | 3/1978 | Nitta | |
| 6,065,077 A * | 5/2000 | Fu | G06F 12/0813 709/233 |
| 6,420,754 B2 | 7/2002 | Takahasi et al. | |
| 6,545,935 B1 | 4/2003 | Hsu et al. | |
| 7,263,148 B2 | 8/2007 | Chang et al. | |
| 7,526,602 B2 | 4/2009 | Kuwabara | |
| 8,090,897 B2 | 1/2012 | Natarjan et al. | |
| 8,200,883 B2 | 6/2012 | MacWilliams et al. | |
| 8,253,751 B2 | 8/2012 | MacWilliams et al. | |

(Continued)

OTHER PUBLICATIONS www.wiikipedia.com, Static Random-Access Memory, Feb. 2017, pp. 1-5 (Year: 2017).*

(Continued)

*Primary Examiner* — Henry Tsai
*Assistant Examiner* — Dean Phan

(57) ABSTRACT

A processing element/unit can include a plurality of networks, a plurality of cores, crossbar interconnects, a plurality of memory controllers and local memory on an integrated circuit (IC) chip. The plurality of cores can be coupled together by the plurality of networks on chip. The crossbar interconnects can couple the networks of cores to the plurality of memory controllers. The plurality of memory controllers can be configured to access data stored in off-chip memory. The local memory can be configured to cache portions of the accessed data. The local memory can be directly accessible by the network of processing cores, or can be distributed across the plurality of memory controllers. The memory controllers can be narrow channel (NC) memory controllers having widths of 4, 8, 12, 16 or a multiple of 4 bits.

20 Claims, 6 Drawing Sheets

(56) References Cited

U.S. PATENT DOCUMENTS

| | | |
|---|---|---|
| 8,255,618 B1 | 8/2012 | Borchers |
| 8,306,042 B1 * | 11/2012 | Abts ................. H04L 45/58 370/401 |
| 8,432,716 B2 | 4/2013 | Miura et al. |
| 8,866,830 B2 | 10/2014 | MacWilliams et al. |
| 9,251,863 B2 | 2/2016 | Kim |
| 9,658,953 B2 | 5/2017 | Sheffler |
| 9,846,550 B2 | 12/2017 | Muralimanohar et al. |
| 9,887,008 B2 | 2/2018 | Lee et al. |
| 10,236,051 B2 | 3/2019 | Ware et al. |
| 10,255,964 B2 | 4/2019 | Shin et al. |
| 10,446,200 B2 | 10/2019 | Hollis |
| 2004/0236894 A1 | 11/2004 | Grundy |
| 2005/0114587 A1 | 5/2005 | Chou |
| 2006/0034307 A1 * | 2/2006 | Uchida ............ H04L 49/3036 370/412 |
| 2006/0053255 A1 * | 3/2006 | Sugizaki ............ G06F 12/0811 711/122 |
| 2010/0077267 A1 | 3/2010 | Perego |
| 2012/0117317 A1 | 5/2012 | Sheffler et al. |
| 2014/0040518 A1 | 2/2014 | Udipi |
| 2014/0164677 A1 | 6/2014 | Borchers |
| 2016/0071608 A1 | 3/2016 | Bronner et al. |
| 2016/0117240 A1 | 4/2016 | Dinkjian |
| 2016/0232112 A1 | 8/2016 | Lee et al. |
| 2017/0285941 A1 | 10/2017 | Nale et al. |
| 2017/0285992 A1 | 10/2017 | Vogt |
| 2018/0090185 A1 | 3/2018 | Hossain |
| 2019/0079676 A1 | 3/2019 | Seo |
| 2019/0095361 A1 | 3/2019 | Morris |
| 2019/0121560 A1 | 4/2019 | Keeth et al. |
| 2019/0138493 A1 * | 5/2019 | Teh ................. G06F 13/4004 |
| 2019/0180805 A1 | 6/2019 | Ware et al. |
| 2019/0188162 A1 | 6/2019 | Kwon et al. |
| 2019/0205268 A1 | 7/2019 | Hampel et al. |
| 2019/0361325 A1 | 11/2019 | Pertierra |
| 2020/0133903 A1 * | 4/2020 | Chen ................. G06F 13/1689 |

OTHER PUBLICATIONS

A+ ExamCram 2: Memory: Types and Forms, Jan. 23, 2004, pp. 1-2 (Year: 2004).*

* cited by examiner

PROCESSING ACCELERATOR ARCHITECTURES

BACKGROUND OF THE INVENTION

Graph databases are utilized in a number of applications ranging from online shopping engines, social networking, recommendation engines, mapping engines, failure analysis, network management, search engines, and the like. Graph databases can be used to determine dependencies, clustering, similarities, matches, categories, flows, costs, centrality and the like in large data set.

A graph database uses a graph structure with nodes, edges and properties to represent and store data for semantic queries. The graph relates data items to a collection of nodes, edges and properties. The nodes, which can also be referred to as vertexes, can represent entities, instance or the like. The edges can represent relationships between nodes, and allow data to be linked together directly. Properties can be information germane to the nodes or edges. Graph databases allow simple and fast retrieval of complex hierarchical structures that are difficult to model in relational systems. A large number of processing operations comprise graph traversal operations such as pointer chasing, wherein a node 150 is read to determine edges 110 pointing to one or more other nodes 120. The one or more other nodes 120 can be read to determine the yet other edges 125, 130 pointing to yet other nodes 135, 140, and so on, as illustrated in FIG. 1. The graph traversal operations and other similar computations can be characterized by a random pattern of accessing edges and nodes. Furthermore, the data accesses associated with graph traversal operations and other similar computations can typically be smaller than a standard minimum cache line access of 64 bytes. The data access in graph processing can also be characterized by intensive utilization of data associated with a cluster of nodes and edges.

Graph processing typically incurs large processing utilization and large memory access bandwidth utilization. Accordingly, there is a need for improved graph processing platforms that can reduce latency associated with the large processing utilization, improve memory bandwidth utilization, and the like.

SUMMARY OF THE INVENTION

The present technology may best be understood by referring to the following description and accompanying drawings that are used to illustrate embodiments of the present technology directed toward processor element/units for graphs processing and other similar applications In one embodiment, a processing element/unit can include a network of a plurality of cores, a local memory, crossbar interconnects and a plurality of memory controllers. The network of the plurality of processor cores, the local memory, the crossbar interconnections and plurality of memory controllers can comprise an integrated circuit (IC) chip. The local memory can be configured to cache data. In one implementation, the local memory can be directly accessible by the plurality of cores. In another implementation, the local memory can be distributed across the plurality of memory controllers. The crossbar interconnects can be configured to couple the network of the plurality of processors cores to the plurality of memory controllers. The plurality of memory controllers can be configured to access off-chip data through a plurality of memory channel interfaces.

In another embodiment, a processing element/unit can include a plurality of networks, a plurality of processor cores, a plurality of narrow channel (NC) memory controllers, local memory and crossbar interconnects. The plurality of cores can be coupled together by the plurality of networks. The crossbar interconnects can be configured to couple the plurality of network to the plurality of narrow channel (NC) memory controllers. The plurality of narrow channel (NC) memory controllers can be configured to access data stored in off-chip memory. The local memory can be coupled to the plurality of memory controllers. The local memory can be configured to cache portions of the data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1:
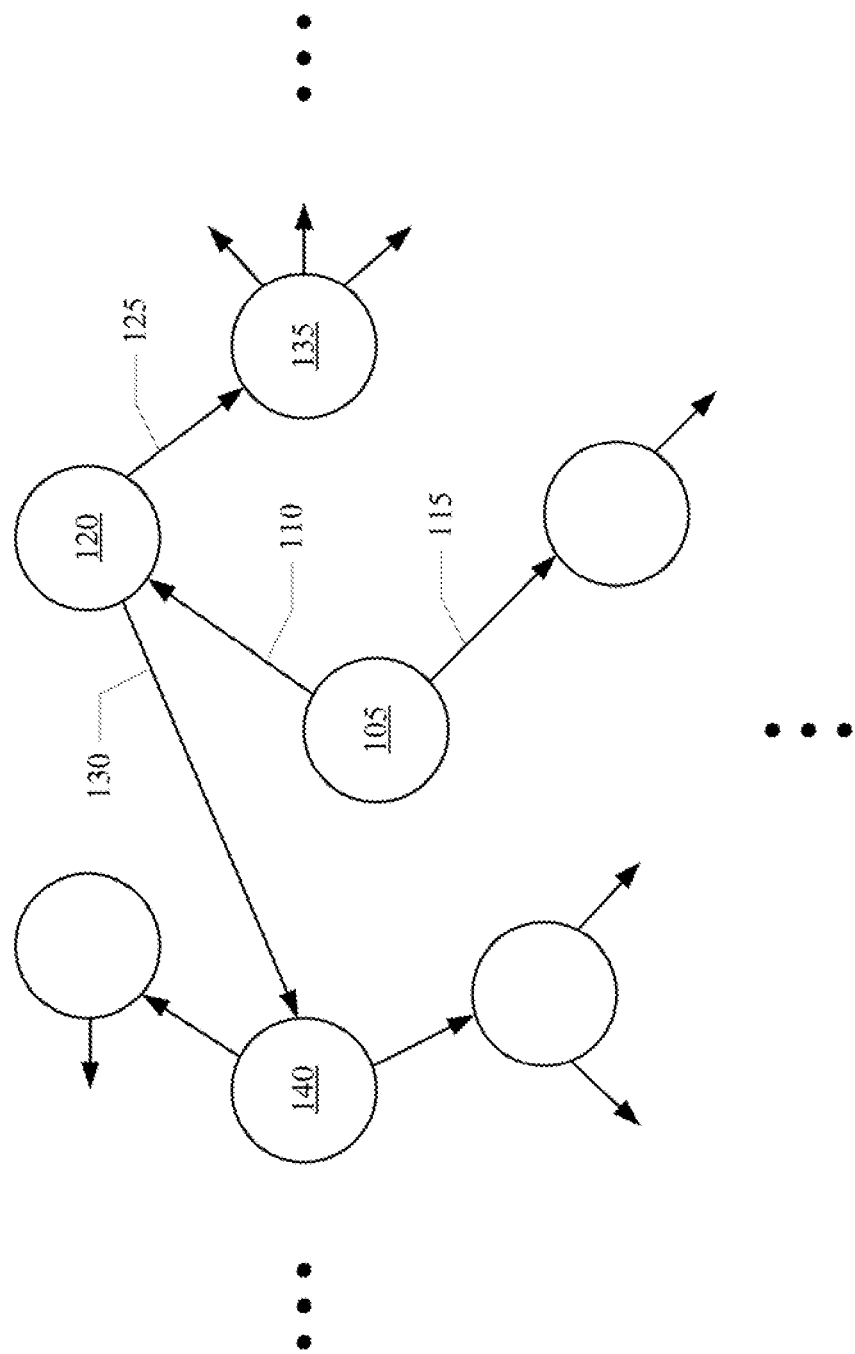
FIG. 1 illustrates an exemplary graph database, according to the conventional art.

Reference will now be made in detail to the embodiments of the present technology, examples of which are illustrated in the accompanying drawings. While the present technology will be described in conjunction with these embodiments, it will be understood that they are not intended to limit the technology to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. The use of the terms "comprises," "comprising," "includes," "including" and the like specify the presence of stated elements, but do not preclude the presence or addition of one or more other elements and or groups thereof. It is also to be understood that although the terms first, second, etc. may be used herein to describe various elements, such elements should not be limited by these terms. These terms are used herein to distinguish one element from another. For example, a first element could be termed a second element, and similarly a second element could be termed a first element, without departing from the scope of embodiments. It is also to be understood that when an element is referred to as being "coupled" to another element, it may be directly or indirectly connected to the other element, or an intervening element may be present. In contrast, when an element is referred to as being "directly connected" to another element, there are not intervening elements present. It is also to be understood that the term "and or" includes any and all combinations of one or more of the associated elements. It is also to be understood that the phraseology and terminology used herein is for the purpose of description and should not be regarded as limiting.

Figure 2:
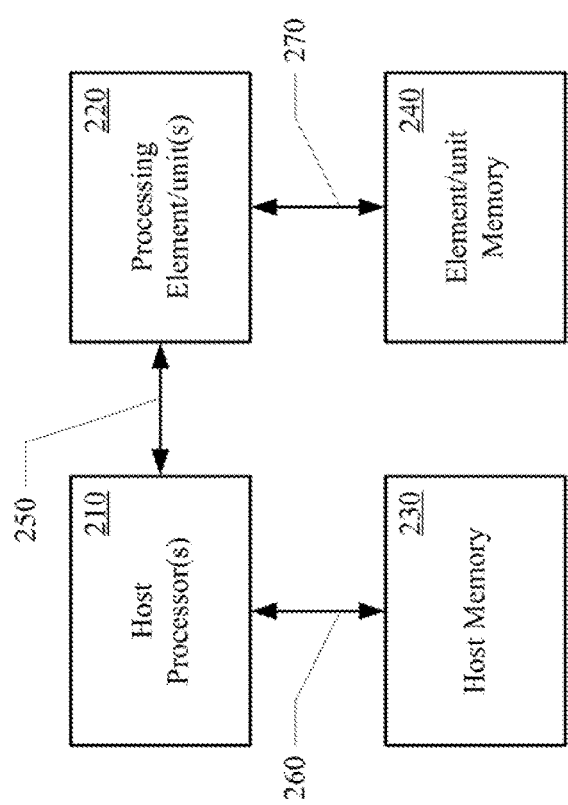
FIG. 2 shows a computing system, in accordance with aspects of the present technology.

Referring to FIG. 2, a computing system, in accordance with aspects of the present technology, is shown. The computing system 200 can include, but is not limited to, one or more host processors 210, one or more processing elements/units 220, host memory 230 and processing elements/unit memory 240. The one or more processing elements/units 220 can be communicatively coupled to the one or more host processors 210 by one or more communication interfaces 250, such as but not limited to one or more peripheral component interface express (PCIe) interfaces or one or more compute express link (CXL) interfaces.

The host memory 230 can be off-chip memory such as dynamic random-access memory (DRAM) or the like, communicatively coupled to the one or more host processors 210 by one or more memory channel communication interfaces 260. In one implementation, the host memory 230 can be characterized by a channel width of 64 bits. The processing element/unit memory 240 can be off-chip memory such as dynamic random-access memory (DRAM) or the like, communicatively coupled to the one or more processing elements/units 220 by a plurality of narrow memory (NC) channel communication interfaces 270. The processing element/unit memory 240 can be characterized by a narrower channel width and smaller access granularity as compared to host memory 230. In one implementation, the processing element/unit memory 240 can be characterized by a channel width of 4, 8 12 16 or a multiple of 4 bits.

The one or more host processors 210 can be configured to manage overall execution of the system 200. The one or more processing elements/units 220 can be configured as one or more accelerators to perform graph processing and or other similar functions.

Figure 3:
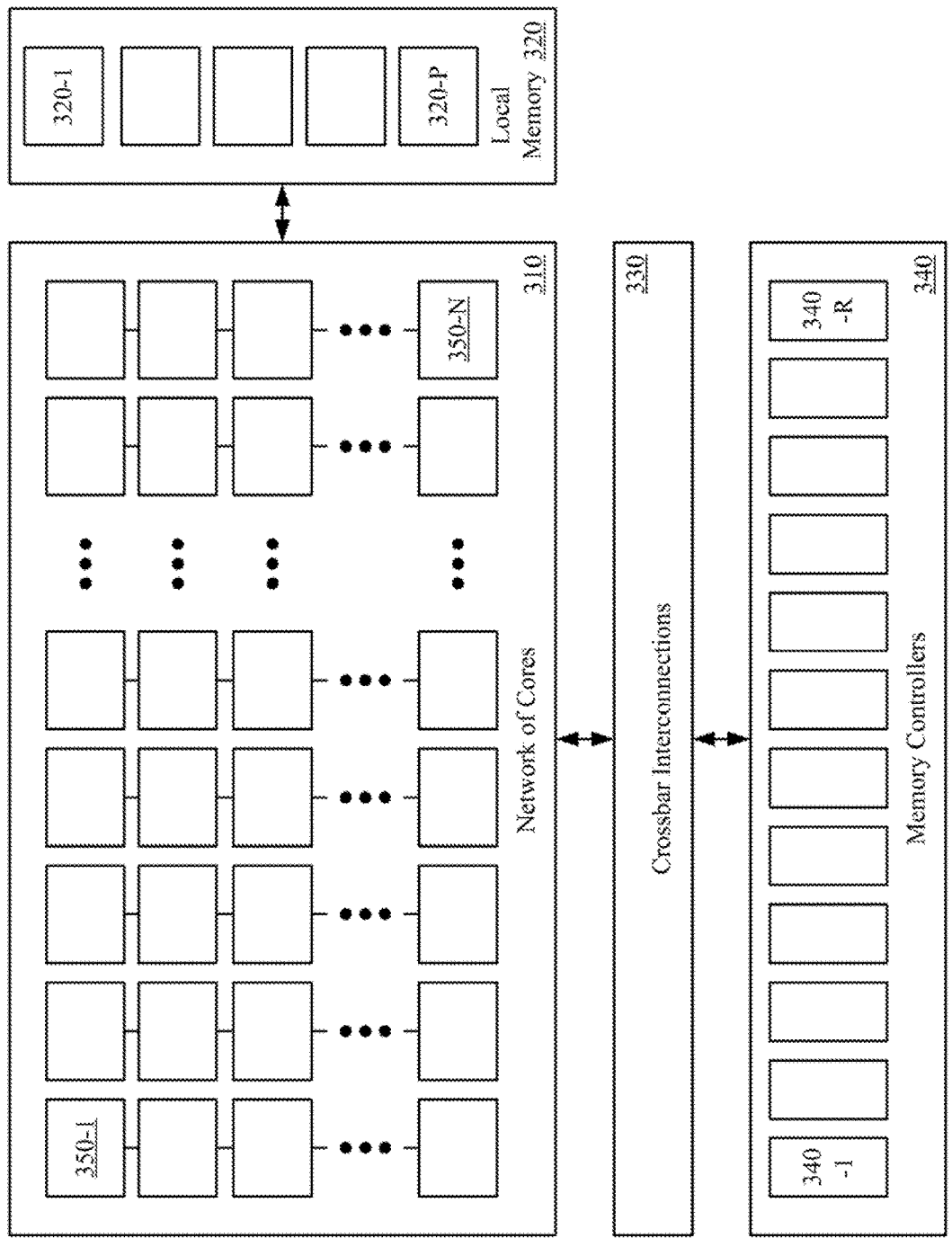
FIG. 3 shows a processing element/unit architecture, in accordance with aspects of the present technology.

Referring now to FIG. 3, a processing element/unit architecture, in accordance with aspects of the present technology, is shown. The processing element/unit 300 can include, but is not limited to, a network of cores 310, crossbar interconnections 330 memory controllers 340 and local memory 320 (e.g., local to the network of cores 310, crossbar interconnections 330 and memory controllers 340). In one implementation, the processing element/unit 300 can be fabricated as an integrated circuit (IC) chip. In one implementation, the network of cores 310 can include hundreds, thousands or even more cores 350, such as reduced instruction set (RISC-V) cores, advanced RISC machine (ARM) cores or the like. The plurality of cores 350 can be communicatively coupled together by one or more networks on chip (NoC), and can include topologies such as but not limited to, mesh, tour, octagon, tree, ring, star, and combinations thereof.

The local memory 320 can be coupled to the network of cores 310. Graph processing can be characterized by small amounts of data that are intensively used, and therefore the local memory 320 can be near cached memory shared by the plurality of cores. In one implementation, the local memory 320 can be static random-access memory (SRAM). In one implementation, the local memory 320 can be managed in computing device executable instructions (e.g., software application) executing on one or more cores of the network of cores 310, on one or more host processors (not shown), or the like. The local memory 310 can be configured to either service a given memory request from the network or cores 310 from within the local memory 320, or pass the given memory request to the memory controllers 340. For example, the local memory 320 can receive a memory read or write instruction from the network of cores 310. If the memory read or write instruction is a hit for data cached in one of the local memories 320, the data can be read from or written to the given local memory 320. In one implementation, the local memory 320 can be shared by the network of cores 310, such that any of the cores 350 can access any of the local memory 320. In one implementation, the local memory 320 can be a scratchpad memory that is a relatively high-speed internal memory used for temporary storage of data for rapid retrieval.

The network of cores 310 can also be coupled to the memory controllers 340 by the crossbar interconnections 330. The crossbar interconnections 330 can be a collection of switches arranged in a matrix configuration. The switches of the crossbar interconnects 330 can be coupled between the network of cores 310 and the memory controllers 340 to form a crossed pattern of interconnects. The crossbar interconnects 330 can be non-blocking to allow concurrent connections that do not prevent connecting other inputs to other outputs. If the memory read or write instruction is a miss in the local memory 320, the memory read or write instruction can be passed through the crossbar interconnection 330 to the applicable memory controller for appropriate access to the element/unit memory (not shown). In one implementation, a portion of the memory address of a memory read or write access can be utilized by the crossbar interconnections 330 to route the memory read or write access to a corresponding memory controller 340.

The memory controllers 340 can be configurable to couple to one or more off-chip element/unit memories (not shown) by one or more memory channels (not shown). In one implementation, the external memory can be dynamic random-access memory (DRAM). The memory channels of the memory controllers 340 can be characterized by a relatively narrow channel (NC) width of approximately 4, 8, 12, 16 or a multiple of 4 bits. In one implementation, the narrow channel (NC) can be implemented by a plurality of portions of a standard memory channel. In another implementation, the narrow channel (NC) can be implemented by reducing the burst length of memory accesses.

Figure 4:
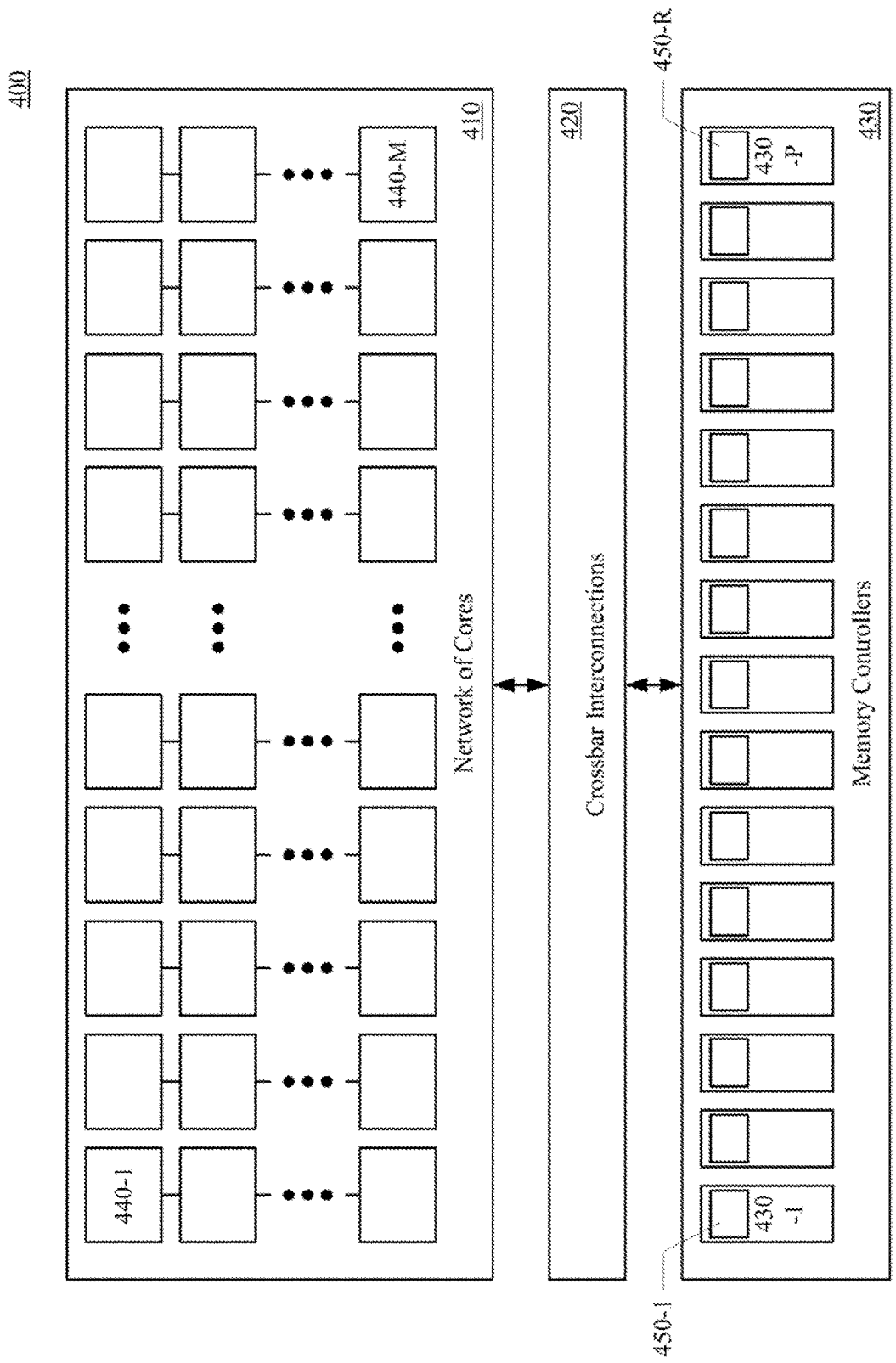
FIG. 4 shows a processing element/unit architecture, in accordance with aspects of the present technology.

Referring now to FIG. 4, another processing element/unit architecture, in accordance with aspects of the present technology, is shown. The processing element/unit 400 can include, but is not limited to, a network of cores 410, crossbar interconnect 420, and memory controllers 430. In one implementation, the processing element/unit 400 can be fabricated as an integrated circuit (IC) chip. In one implementation, the network of cores 410 can include hundreds, thousands or even more cores 440. such as reduced instruction set (RISC-V) cores, advanced RISC machine (ARM) cores or the like. The plurality of cores 440 can be communicatively coupled together by one or more networks of connections (NoC), and can include topologies such as but not limited to mesh, tour, octagon, tree, ring, star, and combinations thereof.

The network of cores 410 can be coupled to the memory controllers 430 by the crossbar interconnections 420. The crossbar interconnections 420 can be a collection of switches arranged in a matrix configuration. The switches of the crossbar interconnections 420 can be coupled between the network of cores 410 and the memory controllers 430 to form a crossed pattern of interconnects. The crossbar interconnects 420 can be non-blocking to allow concurrent connections that do not prevent connecting other input to other output. In one implementation, a portion of a memory address of a memory read or write access can be utilized by the crossbar interconnections 420 to route the memory read or write access to a corresponding memory controller 430.

The memory controllers 430 can be configurable to couple to one or more off-chip element/unit memories (not shown) by one or more memory channels (not shown). The memory channels of the memory controllers can be characterized by a relatively narrow channel (NC) width of approximately 4, 8, 12, 16 or a multiple of 4 bits. Accordingly, the memory controllers 430 can be configurable to implement a customizable memory channel. The given memory controller can be configured for a relatively small memory access granulator of approximately 64 bytes. The memory controllers 430 can also include local memory 450. In one implementation, the local memory 450 can be distributed across the memory controllers 430, such that portions of the local memory 450 are incorporated in respective memory controllers 430.

The memory controllers 430 can be configured to receive corresponding memory read and write access requests routed by the crossbar interconnections 420 from the network of cores 410. The memory controller 430 can check to see if the data of the read or write access request resides in the corresponding local memory 450 (e.g., local memory hit). In one implementation, the local memory 450 can be static random-access memory (SRAM) or the like. If the corresponding data is not in the corresponding local memory 450 (e.g., local memory miss), the corresponding memory controller 430 can access external memory (e.g., off-chip element/unit memory). In one implementation, the external memory can be dynamic random-access memory (DRAM).

Figure 5:
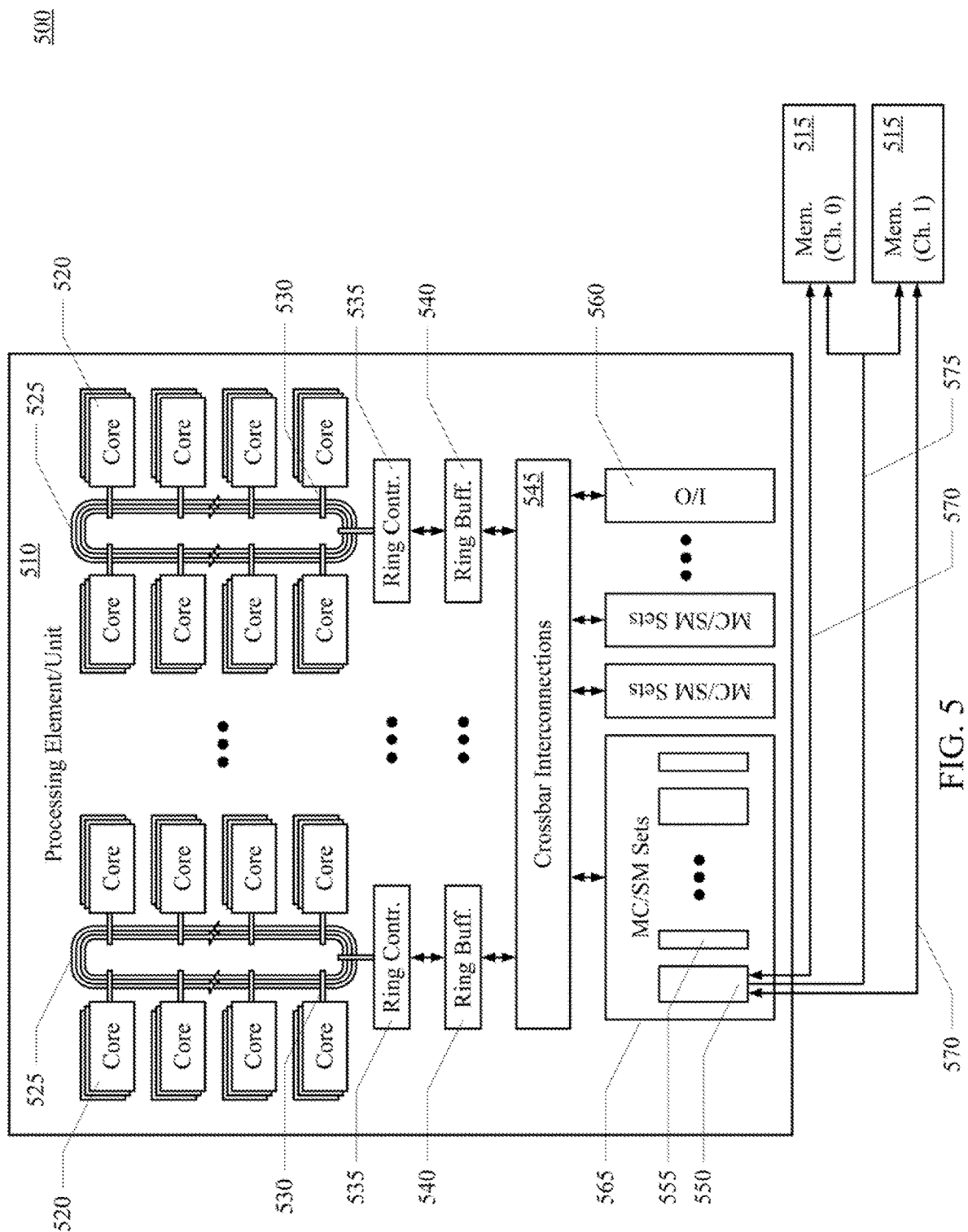
FIG. 5 shows a processing element/unit architecture, in accordance with aspects of the present technology.

Referring now to FIG. 5, a system including a processing element/unit architecture, in accordance with aspects of the present technology, is shown. The system 500 can include, but is not limited to, one or more host processors (not shown), host memory (not shown), one or more processing elements/units 510, and element/unit memory 515. The processing element/unit 510 can include, but is not limited to, a plurality of cores 520, one or more networks 525-540, crossbar interconnections 545, a plurality of memory controllers 550, and one or more local memories 555. In one implementation, the processing element/unit 510 can be fabricated as an integrated circuit (IC) chip.

The one or more networks 525-540 can be configured to communicatively couple the plurality of cores 520 together. The crossbar interconnects 545 can be configured to communicatively couple the one or more networks 525-540 of cores 520 to the plurality of memory controllers 550 and one or more local memories 555. In one implementation, the one or more networks 525-540 can include one or more network communication channels 525 and one or more communication channel interfaces 530 arranged in one or more topologies, such as but not limited to mesh, tour, octagon, tree, ring, star, and combinations thereof. In one implementation, the one or more networks 525-540 can include a plurality of ring topology communication channels 525, a plurality of ring channel interfaces 530, respective ring controllers 535 and respective ring buffers 540 configured to communicatively couple respective groups of cores 520 to the crossbar interconnects 545.

In one implementation, the plurality of cores 530 can include hundreds, thousands or even more simple cores. such as reduced instruction set (RISC-V) cores, advanced RISC machine (ARM) cores or the like. In one implementation, the plurality of cores 520 can be organized in groups of cores, and the groups of cores can be organized in sets. Each set of cores can be coupled to a respective communication channel interface. For example, a processing element/unit 510 can include twelve ring networks 525-540, each ring network 525-540 can include ten groups of cores, each group of cores can include eight cores coupled to a respective ring channel interface 530.

The crossbar interconnects 545 can be configured to communicatively couple together the network 525-540 of cores 520 and the plurality of memory controllers 550. In one implementation, the crossbar interconnects 545 can be configured to couple cores 520 in a given one of a plurality of networks 525-540 to the cores 520 in the other ones of the plurality of networks 525-540. The crossbar interconnects 545 can also be configured to couple cores 520 in the plurality of networks 525-540 to the plurality of memory controllers 550. The crossbar interconnections 545 can be a collection of switches arranged in a matrix configuration. The switches of the crossbar interconnects 545 can be coupled between the networks 525-540 of cores 520 and the memory controllers 550 to form a crossed pattern of interconnects between which connections can be established. The crossbar interconnects 545 can be non-blocking to allow concurrent connections that do not prevent connecting other inputs to other outputs.

The processing element/unit 510 can also include other sub-circuits such as one or more input/output interfaces 560 and the like. The one or more input/output interfaces 560, for example, can include one or more peripheral component interface express (PCIe) interfaces, one or more compute express link (CXL) interfaces, or the like for communicatively coupling the processing element/unit 510 to one or more host processors (not shown). The one or more input/output interfaces 560 can also couple the processing element/unit 510 to one or more additional processing elements/units.

The crossbar interconnects 545 can communicatively couple the one or more input/output interfaces 560 to the one or more networks 525-540 of cores 520. In one implementation, software executing on one or more host processors (not shown) can send instruction across the one or more input/output interfaces 560 to control allocation of graph processing functions to the plurality of cores 520. For example, the graph processing software can control allocation of graph processing functions to the plurality of cores 520. In another example, an operating system, alone or in combination with the graph processing software, can control allocation of graph processing functions to the plurality of cores 520

The plurality of memory controllers 550 can be coupled to off-chip element/unit memory 515 by one or more respective memory channels 570, 575. As used herein, the term off-chip is used to indicate that the element/unit memory is not fabricated on the integrated circuit (IC) chip of the processing element/unit 510. The plurality of memory controllers 550 can also be coupled to respective local memory 555. In one implementation, the local memory 555 can be static random-access memory (SRAM) or the like. In one implementation, the memory controllers 550 and local memory 555 can be organized in a plurality of sets 565. Each set 565 can include a group of memory controllers 550 and corresponding local memory 555.

The memory channels of the memory controllers 550 can be characterized by a relatively narrow channel (NC) width of approximately 4, 8, 12, 16 or a multiple of 4 bits. Accordingly, the memory channel can be customizable. The given memory controller can be configured for a relatively small memory access granulator of approximately 64 bytes. In one implementation, each memory controller 550 can be coupled to a group of element/unit memories 515 by a group of data lines 570 and shared address and control lines 575.

The memory controllers 550 can be configured to receive corresponding memory read and write access requests routed by the crossbar interconnections 545 from the network 525-540 of cores 520. A corresponding memory controller 550 can check to see if the data of the read or write access request resides in the corresponding local memory 555 (e.g., local memory hit). If the corresponding data is not in the corresponding local memory 555 (e.g., local memory miss), the corresponding memory controller 550 can access corresponding off-chip element/unit memory 515.

The processing element/unit including the network of cores can advantageously provide a high degree of generality and programmability. The relatively simple cores advantageously enable the processing element/unit to include a very large number of cores. The processing element/unit including the network of cores and narrow channel (NC) memory controllers also advantageously enable intensive access to random memory. The intensive random memory access is advantageous for large threads of point-chasing and the like. The network of cores and narrow channel (NC) memory controllers can also advantageously reduce processing latency and memory access latency.

Figure 6:
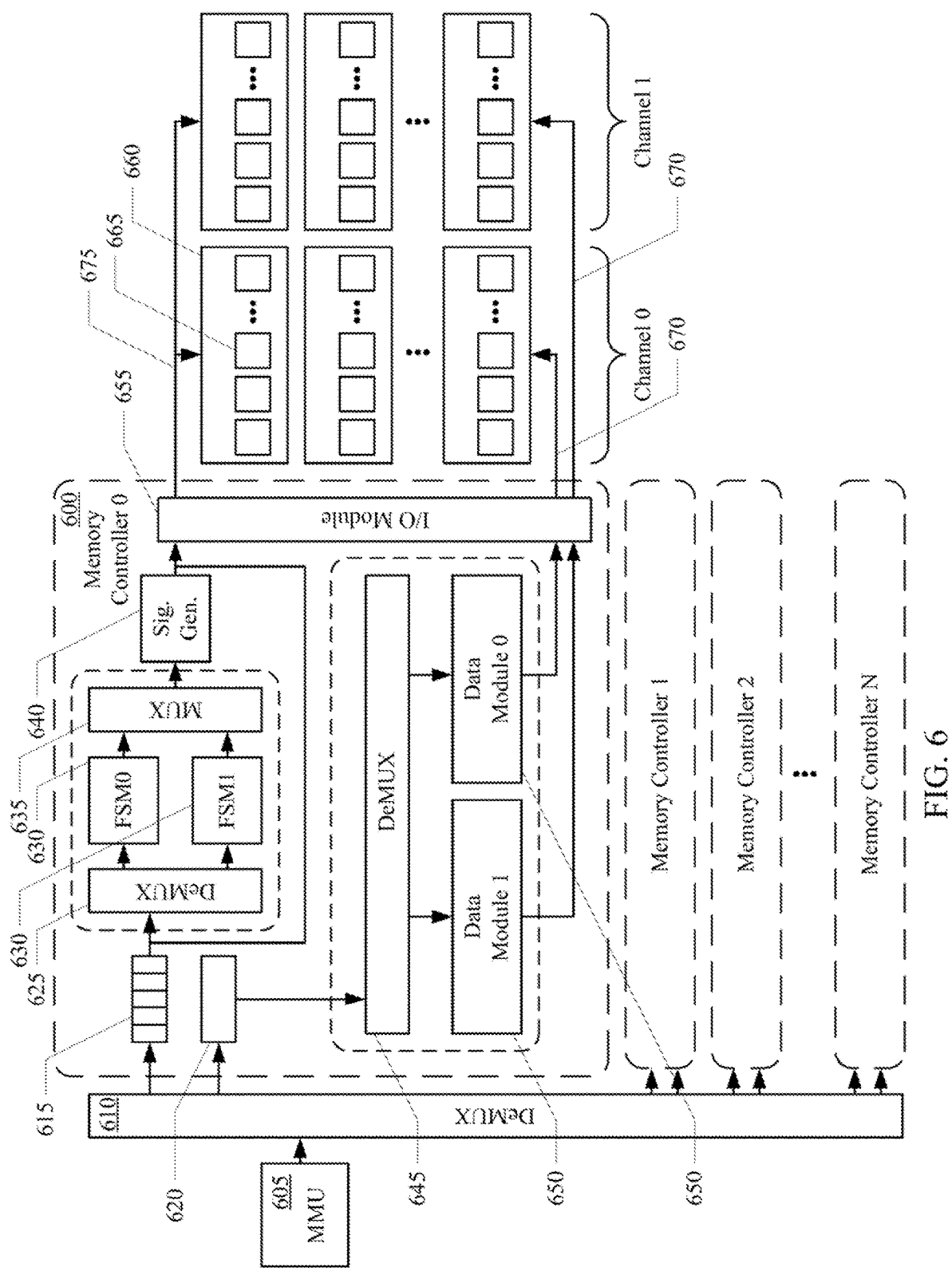
FIG. 6 shows a narrow channel (NC) memory controller, in accordance with aspects of the present technology.

Referring now to FIG. 6, a narrow channel (NC) memory controller, in accordance with aspects of the present technology, is shown. The narrow channel (NC) memory controller 600 can including a memory management unit 605, a memory request demultiplexer 610, a request queue 615, a data buffer 620, a command demultiplexer 625, a plurality of finite state machines 630, a command multiplexer 635, a signal generator 640, a data demultiplexer 645, a plurality of data modules 650 and an input/output module 655. The narrow channel (NC) memory controller 600 can be coupled to a plurality of narrow channel (NC) memories 660, 665. In one implementation, the narrow channel (NC) memories 660, 665 comprise a plurality of memory cards 660, each including a plurality of memory chips 665. In one implementation, the memory cards 660 can be dynamic random-access memory (DRAM) cards (e.g., printed circuit boards). In one implementation, the memory chips can be dynamic random-access memory (DRAM) integrated circuits (IC) chips compliant with a commodity memory chip standard such as, but not limited to, Joint Electron Device Engineering Council (JEDEC). In one implementation, the memory chips 665 can have data pins for transferring a specified number of bits of data. For example, the memory chips 665 can have data pins for input and output of 2, 4, 8, 16 or a multiple of 4 bits of data. In one implementation, the memory chips 665 can be organized into ranks to provide a predetermined number of bytes of data, such as 2 memory chips per rank each chip having data pins for access to 4 bits each, or 1 memory chip per rank each chip having data pins for access to 8 bits each. As used herein the term narrow channel (NC) comprises a predetermined fraction of standard memory channel, and a multiple (e.g., 1×, 2× . . . ) of the bit width of the component memory integrated circuit (IC) chips. In one implementation, the width of a narrow channel (NC) can be equal to a bit width of a rank of dynamic-random access memory (DRAM), wherein a rank is a set of IC chips that share the same chip select signal.

In one implementation, the narrow channel (NC) memory controller 600 can communicate with each channel with a close page policy. Each memory controller 600 can control two individual channels at the same time utilizing dedicated data buses 670 for each individual channel and a shared common command bus 675. In one implementation, the memory controller can utilize auto-precharge write and read command (WRA/RDA), instead of standard write and read commands (WR/RD). The auto-precharge write and read commands can be configured to preserve a slot on the command bus and therefore provide balanced command bus and data bus utilization.

The narrow channel (NC) memory controller 600 with relatively small access granularity can advantageously improve data utilization and improve data bus throughput for a given data bus bandwidth for poor data locality applications such as graph processing. The close page policy can provide improved random-access to data for use in applications such as graph processing. The narrow channel (NC) memory controller 600 can also advantageously work with readily available commodity memories, such as dynamic random-access memory (DRAM).

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A processing element/unit comprising:
a plurality of processor cores coupled together by one or more communication networks;
a local memory configured to cache data for use by the plurality of processor cores, wherein the local memory is shared by the plurality of processor cores such that any of the plurality of processor cores accesses any of the local memory;
crossbar switch interconnections configured to couple the one or more networks to a plurality of memory controllers wherein a portion of an address of a memory access is utilized by the crossbar switch interconnections to route the memory access to a corresponding one of the plurality of memory controllers;
the plurality of memory controllers configured to access data stored in memory through a plurality of narrow memory channel interfaces implemented by a plurality of portions of a standard memory channel, wherein a narrow channel width is equal to a bit width of a rank of the memory; and
wherein the one or more networks, the plurality of processor cores, the local memory, the crossbar interconnections and the plurality of memory controllers comprise an integrated circuit (IC) chip.

2. The processing element/unit of claim 1, wherein the local memory is coupled to the one or more networks.

3. The processing element/unit of claim 1, wherein the local memory is distributed across the plurality of memory controllers.

4. The processing element/unit of claim 1, wherein the local memory comprises static random-access memory.

5. The processing element/unit of claim 1, wherein the plurality of memory controllers comprise a plurality of narrow memory (NC) channel dynamic random-access memory controllers.

6. The processing element/unit of claim 1, wherein the one or more networks comprise one or more mesh networks, one or more tour networks, one or more octagon networks, one or more tree networks, one or more ring networks and one or more star networks.

7. The processing element/unit of claim 1, further comprising:
one or more communication interfaces configured to couple the one or more networks to a host processor.

8. The processing element/unit of claim 7, wherein the crossbar interconnects couple the one or more communication interfaces to the one or more networks of the plurality of processor cores.

9. The processing element/unit of claim 7, wherein the one or more communication interfaces comprise one or more peripheral component interface express (PCIe) interfaces or one or more compute express link (CXL) interfaces.

10. The processing element/unit of claim 1, wherein the plurality of processor cores comprise a plurality of reduced instruction set (RISC-V) cores or a plurality of advanced RISC machine (ARM) cores.

11. The processing element/unit of claim 1, wherein the local memory comprises static random-access memory (SRAM).

12. The processing element/unit of claim 1, wherein the plurality of memory controllers are configured to access dynamic random-access memory (DRAM).

13. A processing element/unit comprising:
a plurality of networks;
a plurality of processor cores organized in groups of cores and the groups of cores are organized in sets of cores, wherein each group of cores in a set of cores is coupled by respective communication channel interfaces to a respective one of the plurality of networks;
a plurality of narrow channel (NC) memory controllers configured to access data stored in off-chip memory through a plurality of portions of a standard memory channel, wherein a narrow channel width is equal to a bit width of a rank of the off-chip memory;
local memory coupled to the plurality of narrow channel (NC) memory controllers accessible to all of the plurality of cores, wherein the local memory is configured to cache a portion of the data; and
crossbar switch interconnects configured to couple the plurality of networks to the plurality of narrow channel (NC) memory controllers, wherein a portion of an address of a memory access is utilized by the crossbar switch interconnections to route the memory access to a corresponding one of the plurality of memory controllers.

14. The processing element/unit of claim 13, wherein the plurality of networks comprises:
respective bi-directional communication channels;
a plurality of communication channel interfaces configured to couple the plurality of processor cores to corresponding bi-directional communication channels and the corresponding bi-directional communication channels to corresponding network controllers; and
network buffers configured to couple the corresponding network controllers to the crossbar interconnects.

15. The processing element/unit of claim 14, wherein the plurality of networks comprise a plurality of ring networks.

16. The processing element/unit of claim 15, further comprising:
one or more communication interfaces configured to couple the plurality of networks to a host processor.

17. The processing element/unit of claim 16, wherein the one or more communication interfaces comprise one or more peripheral component interface express (PCIe) interfaces or one or more compute express link (CXL) interfaces.

18. The processing element/unit of claim 13, wherein the plurality of processor cores comprise a plurality of reduced instruction set (RISC-V) cores or a plurality of advanced RISC machine (ARM) cores.

19. The processing element/unit of claim 13, wherein the plurality of narrow channel (NC) memory controllers include multiple respective dedicated data buses and a shared command bus configured to couple to the off-chip memory.

20. The processing element/unit of claim 13, wherein the plurality of narrow channel (NC) memory controllers and the off-chip memory are configured in sets of the plurality of narrow channel (NC) memory controller and local memory.

* * * * *